(12) United States Patent
Hamilton et al.

(10) Patent No.: US 10,568,150 B2
(45) Date of Patent: *Feb. 18, 2020

(54) TECHNIQUES FOR AUTOMATICALLY ESTABLISHING A LONG-LASTING CONNECTION ACROSS COMPUTING DEVICES CONFIGURED FOR SHORT-RANGE WIRELESS COMMUNICATION

(71) Applicant: Google LLC, Mountain View, CA (US)

(72) Inventors: Jeffrey William Hamilton, Austin, TX (US); Nicholas Julian Pelly, San Francisco, CA (US); Benjamin J. Dodson, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,823

(22) Filed: Feb. 20, 2019

(65) Prior Publication Data
US 2019/0191469 A1    Jun. 20, 2019

Related U.S. Application Data

(63) Continuation of application No. 14/751,815, filed on Jun. 26, 2015, now Pat. No. 10,251,203, which is a
(Continued)

(51) Int. Cl.
*H04B 5/00* (2006.01)
*H04W 76/10* (2018.01)
(Continued)

(52) U.S. Cl.
CPC .......... *H04W 76/10* (2018.02); *H04B 5/0031* (2013.01); *H04L 67/34* (2013.01);
(Continued)

(58) Field of Classification Search
CPC .............................. H04W 76/10; H04W 4/80
See application file for complete search history.

(56) References Cited

U.S. PATENT DOCUMENTS

| | | |
|---|---|---|
| 5,301,309 A | 4/1994 | Sugano |
| 5,819,021 A | 10/1998 | Stanfill |

(Continued)

FOREIGN PATENT DOCUMENTS

| | | |
|---|---|---|
| CN | 1945535 | 4/2007 |
| CN | 101379716 | 3/2009 |

(Continued)

OTHER PUBLICATIONS

"Advisory Action", U.S. Appl. No. 14/751,815, dated Oct. 12, 2016, 5 pages.
(Continued)

*Primary Examiner* — Tuan H Nguyen
(74) *Attorney, Agent, or Firm* — Colby Nipper

(57) ABSTRACT

A computer-implemented technique includes initiating, at a first computing device including one or more processors, communication with a second computing device via a short-range wireless communication protocol. The technique includes receiving, at the first computing device, a set of information from the second computing device via the short-range wireless communication protocol, the set of information for configuring communication via a different, second wireless communication protocol.

20 Claims, 3 Drawing Sheets

Related U.S. Application Data continuation of application No. 13/834,900, filed on Mar. 15, 2013, now Pat. No. 9,125,180.

(51) Int. Cl.
| | | |
|---|---|---|
| *H04L 29/08* | (2006.01) | |
| *H04W 4/50* | (2018.01) | |
| *H04W 4/80* | (2018.01) | |
| *G08C 17/02* | (2006.01) | |
| *H04W 8/00* | (2009.01) | |

(52) U.S. Cl.
CPC .............. *H04W 4/50* (2018.02); *H04W 4/80* (2018.02); *G08C 17/02* (2013.01); *H04M 2250/04* (2013.01); *H04W 8/005* (2013.01)

(56) References Cited

U.S. PATENT DOCUMENTS

| | | | |
|---|---|---|---|
| 6,462,757 | B1 | 10/2002 | Obata et al. |
| 6,462,767 | B1 | 10/2002 | Obata et al. |
| 6,634,025 | B1 | 10/2003 | Hauptmann et al. |
| 7,089,007 | B2 | 8/2006 | Wakuta et al. |
| 7,516,891 | B2 | 4/2009 | Chaum |
| 7,529,653 | B2 | 5/2009 | Frankel et al. |
| 7,775,432 | B2 | 8/2010 | Jalkanen et al. |
| 7,821,399 | B2 | 10/2010 | Otranen |
| 7,957,518 | B2 | 6/2011 | Erb |
| 7,957,733 | B2 | 6/2011 | Wang et al. |
| 7,962,142 | B2 | 6/2011 | O'Neill et al. |
| 7,970,350 | B2 | 6/2011 | Sheynman et al. |
| 7,995,533 | B1 | 8/2011 | Koodi et al. |
| 8,056,113 | B2 | 11/2011 | Balasubramanian et al. |
| 8,060,389 | B2 | 11/2011 | Johnson |
| 8,060,560 | B2 | 11/2011 | Vonog et al. |
| 8,082,327 | B2 | 12/2011 | Schulsser |
| 8,112,066 | B2 | 2/2012 | Ayed |
| 8,126,395 | B2 | 2/2012 | Tasala et al. |
| 8,171,137 | B1 | 5/2012 | Parks |
| 8,187,100 | B1 | 5/2012 | Kahn et al. |
| 8,214,686 | B2 | 7/2012 | Ueda |
| 8,224,894 | B1 | 7/2012 | Parks et al. |
| 8,244,917 | B2 | 8/2012 | Takayama et al. |
| 8,308,065 | B2 | 11/2012 | Jalkanen et al. |
| 8,358,596 | B2 | 1/2013 | Byrne et al. |
| 8,366,000 | B2 | 2/2013 | Jalkanen |
| 8,386,563 | B2 | 2/2013 | Parks et al. |
| 8,478,816 | B2 | 7/2013 | Parks et al. |
| 8,832,681 | B1 | 9/2014 | Cantrell |
| 9,100,064 | B2 | 8/2015 | Griffin et al. |
| 9,125,180 | B1 | 9/2015 | Hamilton et al. |
| 9,184,800 | B2 | 11/2015 | Hamilton |
| 9,192,859 | B2 | 11/2015 | Perlman et al. |
| 9,237,189 | B2 | 1/2016 | Parks et al. |
| 9,258,693 | B2 | 2/2016 | Stouder-Studenmund |
| 9,314,691 | B2 | 4/2016 | Perlman et al. |
| 9,352,222 | B2 | 5/2016 | Perlman |
| 9,526,120 | B2 | 12/2016 | Pelly et al. |
| 10,225,711 | B2 | 3/2019 | Parks et al. |
| 10,251,203 | B2 | 4/2019 | Hamilton et al. |
| 2002/0033981 | A1 | 3/2002 | Keller |
| 2003/0220937 | A1 | 11/2003 | Maeoka et al. |
| 2004/0055004 | A1 | 3/2004 | Sun et al. |
| 2004/0110504 | A1 | 6/2004 | Kenagy et al. |
| 2005/0058112 | A1 | 3/2005 | Lahey et al. |
| 2005/0235029 | A1 | 10/2005 | Hussman |
| 2006/0094356 | A1 | 5/2006 | Dawidowsky |
| 2006/0179079 | A1 | 8/2006 | Kolehmainen |
| 2006/0294435 | A1 | 12/2006 | Vick et al. |
| 2007/0014314 | A1 | 1/2007 | O'Neil |
| 2007/0043574 | A1 | 2/2007 | Coffman et al. |
| 2007/0115827 | A1 | 5/2007 | Boehnke et al. |
| 2007/0136392 | A1 | 6/2007 | Oh et al. |
| 2007/0160047 | A1 | 7/2007 | Park et al. |
| 2007/0263828 | A1 | 11/2007 | Lee et al. |
| 2007/0282990 | A1 | 12/2007 | Kumar et al. |
| 2007/0297356 | A1 | 12/2007 | Rofougaran |
| 2008/0081558 | A1 | 4/2008 | Dunko et al. |
| 2008/0139116 | A1 | 6/2008 | Balgard et al. |
| 2008/0278567 | A1 | 11/2008 | Nakajima |
| 2008/0294937 | A1 | 11/2008 | Ueda |
| 2008/0310611 | A1 | 12/2008 | Moriwaki et al. |
| 2009/0003281 | A1 | 1/2009 | Panabaker |
| 2009/0111378 | A1 | 4/2009 | Sheynman et al. |
| 2009/0116445 | A1 | 5/2009 | Samar et al. |
| 2009/0118018 | A1 | 5/2009 | Periman et al. |
| 2009/0132362 | A1 | 5/2009 | Fisher et al. |
| 2009/0157799 | A1 | 6/2009 | Sukumaran et al. |
| 2009/0204966 | A1 | 8/2009 | Johnson et al. |
| 2009/0244015 | A1 | 10/2009 | Sengupta et al. |
| 2009/0248875 | A1 | 10/2009 | Kamijima et al. |
| 2010/0031168 | A1 | 2/2010 | Loriedo et al. |
| 2010/0061294 | A1 | 3/2010 | Proctor et al. |
| 2010/0081385 | A1 | 4/2010 | Lin et al. |
| 2010/0082136 | A1 | 4/2010 | Rosenblatt et al. |
| 2010/0082445 | A1 | 4/2010 | Hodge et al. |
| 2010/0082567 | A1 | 4/2010 | Rosenblatt et al. |
| 2010/0094948 | A1 | 4/2010 | Ganesh et al. |
| 2010/0166064 | A1 | 7/2010 | Perlman et al. |
| 2010/0167809 | A1 | 7/2010 | Perlman et al. |
| 2010/0178868 | A1 | 7/2010 | Charrat |
| 2010/0328225 | A1 | 12/2010 | Black |
| 2010/0332635 | A1 | 12/2010 | Rogel et al. |
| 2011/0047598 | A1 | 2/2011 | Lindley et al. |
| 2011/0065384 | A1 | 3/2011 | Cader et al. |
| 2011/0072501 | A1 | 3/2011 | Fukui |
| 2011/0074703 | A1 | 3/2011 | Black |
| 2011/0078245 | A1 | 3/2011 | Kiffer |
| 2011/0119628 | A1 | 5/2011 | Carter et al. |
| 2011/0148752 | A1 | 6/2011 | Alameh et al. |
| 2011/0183614 | A1 | 7/2011 | Tamura |
| 2011/0205944 | A1 | 8/2011 | Miyabayashi et al. |
| 2011/0210830 | A1 | 9/2011 | Talty et al. |
| 2011/0223937 | A1 | 9/2011 | Leppanen et al. |
| 2011/0275316 | A1 | 11/2011 | Bacioccola |
| 2011/0276503 | A1 | 11/2011 | Whittington |
| 2011/0312303 | A1 | 12/2011 | Brush et al. |
| 2012/0028578 | A1 | 2/2012 | Tuikka |
| 2012/0079126 | A1 | 3/2012 | Evans et al. |
| 2012/0142433 | A1 | 6/2012 | Perlman et al. |
| 2012/0143944 | A1 | 6/2012 | Reeves et al. |
| 2012/0144233 | A1 | 6/2012 | Griffith et al. |
| 2012/0149476 | A1 | 6/2012 | Griffith et al. |
| 2012/0214413 | A1 | 8/2012 | Rose et al. |
| 2012/0290657 | A1 | 11/2012 | Parks et al. |
| 2012/0290663 | A1 | 11/2012 | Hsieh et al. |
| 2012/0290669 | A1 | 11/2012 | Parks et al. |
| 2012/0329390 | A1 | 12/2012 | Kim |
| 2013/0046976 | A1 | 2/2013 | Rosati et al. |
| 2013/0165045 | A1 | 6/2013 | Cao |
| 2013/0174237 | A1 | 7/2013 | Zises |
| 2013/0214995 | A1 | 8/2013 | Lewin et al. |
| 2013/0219303 | A1 | 8/2013 | Eriksson et al. |
| 2013/0254346 | A1 | 9/2013 | McGowan |
| 2013/0324169 | A1 | 12/2013 | Karnal et al. |
| 2013/0325949 | A1* | 12/2013 | Virani ................ G06F 9/541 |
| | | | 709/204 |
| 2013/0325967 | A1 | 12/2013 | Parks et al. |
| 2013/0344804 | A1 | 12/2013 | Chen et al. |
| 2014/0004793 | A1 | 1/2014 | Bandyopadhyay et al. |
| 2014/0017996 | A1 | 1/2014 | Hamilton et al. |
| 2014/0073300 | A1 | 3/2014 | Leeder et al. |
| 2014/0087654 | A1* | 3/2014 | Kiveisha ............ H04B 5/0031 |
| | | | 455/41.1 |
| 2014/0198024 | A1 | 7/2014 | Adzhigirey et al. |
| 2014/0254575 | A1 | 9/2014 | Venkatraman et al. |
| 2014/0256254 | A1 | 9/2014 | Sarda et al. |
| 2014/0280440 | A1 | 9/2014 | Pelly et al. |
| 2015/0237584 | A1 | 8/2015 | Royston |

(56) References Cited

U.S. PATENT DOCUMENTS

2015/0296546 A1 10/2015 Hamilton et al.
2019/0149972 A1 5/2019 Parks et al.

FOREIGN PATENT DOCUMENTS

| | | |
|---|---|---|
| EP | 1760584 | 3/2007 |
| EP | 2432277 | 3/2012 |
| EP | 2483771 | 8/2012 |
| EP | 2557764 | 2/2013 |
| JP | 2003022189 | 1/2003 |
| JP | 2003242106 | 8/2003 |
| JP | 2004054633 | 2/2004 |
| JP | 2006172440 | 6/2006 |
| JP | 2010205111 | 9/2010 |
| WO | 2005076542 | 8/2005 |
| WO | 2005109829 | 11/2005 |
| WO | 2006111782 | 10/2006 |
| WO | 2007107982 | 9/2007 |
| WO | 2007118250 | 10/2007 |
| WO | 2010110788 | 9/2010 |
| WO | 2011139963 | 11/2011 |

OTHER PUBLICATIONS

"Examiner's Answer to Appeal Brief", U.S. Appl. No. 14/751,815, dated Dec. 28, 2017, 7 pages.
"Extended European Search Report", EP Application No. 12167367.7, dated Jul. 27, 2012, 8 pages.
"Extended European Search Report", EP Application No. 12167369.3, dated Jul. 27, 2012, 9 pages.
"Extended European Search Report", EP Application No. 12167370.1, dated Aug. 22, 2012, 8 pages.
"Final Office Action", U.S. Appl. No. 14/751,815, dated Jun. 27, 2017, 13 pages.
"Final Office Action", U.S. Appl. No. 13/932,232, dated Nov. 1, 2017, 11 pages.
"Final Office Action", U.S. Appl. No. 13/247,725, dated Aug. 10, 2012, 11 pages.
"Final Office Action", U.S. Appl. No. 13/834,622, dated Sep. 30, 2015, 37 pages.
"Final Office Action", U.S. Appl. No. 14/751,815, dated Aug. 3, 2016, 12 pages.
"Foreign Office Action", KR Application No. 10-2013-7031892, dated Dec. 12, 2017, 87 pages.
"Foreign Office Action", French Application No. 1254228, dated Feb. 23, 2018, 2 pages.
"Foreign Office Action", EP Application No. 12167367.7, dated Apr. 20, 2017, 5 pages.
"Foreign Office Action", EP Application No. 12167369.3, dated Apr. 20, 2017, 5 pages.
"Foreign Office Action", Korean Application No. 10-2013-7031892, dated Apr. 25, 2018, 6 pages.
"International Search Report and Written Opinion", Application No. PCT/US2012/036952, 12 pages.
"International Search Report and Written Opinion", Application No. PCT/US2012/036957, dated Jul. 30, 2012, 12 pages.
"International Search Report and Written Opinion", Application No. PCT/US2012/036961, dated Aug. 22, 2012, 12 pages.
"International Search Report and Written Opinion", Application No. PCT/US2013/050483, dated Oct. 10, 2013, 10 pages.
"International Search Report and Written Opinion", Application No. PCT/US2014/025482, dated Aug. 5, 2014, 11 pages.
"Non-Final Office Action", U.S. Appl. No. 13/247,725, dated Dec. 8, 2011, 10 pages.
"Non-Final Office Action", U.S. Appl. No. 13/461,647, dated Sep. 17, 2012, 5 pages.
"Non-Final Office Action", U.S. Appl. No. 13/834,622, dated May 29, 2015, 31 pages.
"Non-Final Office Action", U.S. Appl. No. 14/751,815, dated Apr. 19, 2016, 10 pages.
"Non-Final Office Action", U.S. Appl. No. 14/751,815, dated Mar. 8, 2017, 12 pages.
"Non-Final Office Action", U.S. Appl. No. 13/932,232, dated Jun. 1, 2017, 12 pages.
"Notice of Allowance", U.S. Appl. No. 13/932,232, dated Oct. 10, 2018, 15 pages.
"Notice of Allowance", U.S. Appl. No. 14/751,815, dated Nov. 16, 2018, 7 pages.
"Notice of Allowance", U.S. Appl. No. 13/834,900, dated Dec. 22, 2014, 9 pages.
"Notice of Allowance", U.S. Appl. No. 13/247,755, dated Jan. 4, 2012, 8 pages.
"Notice of Allowance", U.S. Appl. No. 13/549,364, dated Oct. 22, 2012, 5 pages.
"Notice of Allowance", U.S. Appl. No. 13/641,647, dated Mar. 5, 2013, 8 pages.
"Notice of Allowance", U.S. Appl. No. 13/461,647, dated Mar. 5, 2013, 8 pages.
"Notice of Allowance", U.S. Appl. No. 13/775,737, dated Mar. 13, 2015, 5 pages.
"Notice of Allowance", U.S. Appl. No. 13/775,737, dated Sep. 8, 2015, 5 pages.
"Notice of Allowance", U.S. Appl. No. 13/834,622, dated Jan. 29, 2016, 13 pages.
"Notice of Allowance", U.S. Appl. No. 13/834,622, dated Oct. 5, 2016, 13 pages.
"Notice of Allowance", U.S. Appl. No. 13/834,900, dated Apr. 10, 2015, 5 pages.
"Preliminary Search Report", FR Application No. 1254227, dated Feb. 27, 2017, 5 pages.
"Preliminary Search Report", FR Application No. 1254225, dated Mar. 17, 2017, 6 pages.
"Preliminary Search Report", FR Application No. 1254228, dated Mar. 17, 2017, 6 pages.
"Search Report", GB Application No. 1208207.9, dated Aug. 12, 2012, 3 pages.
"Search Report", GB Application No. 1208206A, dated Aug. 13, 2012, 5 pages.
"Search Report", GB Application No. 1208205.3, dated Aug. 13, 2012, 6 pages.
"Search Report", NL Application No. 2008778, dated Nov. 28, 2012, 8 pages.
"Search Report", NL Application No. 2008777, dated Dec. 19, 2012, 11 pages.
"Search Report", NL Application No. 2008779, dated Dec. 21, 2012, 10 pages.
Macey, "Get iPhone iOS 5 Features Now: Use FaceTime Over 3G", http://www.iphonefaq.org/archives/971488, Aug. 8, 2011, 3 pages.

* cited by examiner

TECHNIQUES FOR AUTOMATICALLY ESTABLISHING A LONG-LASTING CONNECTION ACROSS COMPUTING DEVICES CONFIGURED FOR SHORT-RANGE WIRELESS COMMUNICATION

PRIORITY/CROSS-REFERENCE TO RELATED APPLICATIONS

This application is a continuation application of U.S. application Ser. No. 14/751,815, filed on Jun. 26, 2015, which is a continuation application of U.S. application Ser. No. 13/834,900, filed on Mar. 15, 2013, now U.S. Pat. No. 9,125,180, which is related to U.S. application Ser. No. 13/834,622, filed on Mar. 15, 2013, now U.S. Pat. No. 9,526,120, and entitled "TECHNIQUES FOR CONTEXT-BASED APPLICATION INVOCATION FOR SHORT-RANGE WIRELESS COMMUNICATION INTERACTIONS." The disclosure of each of the above applications is incorporated herein by reference in its entirety.

FIELD

The present disclose relates to communication between computing devices and, more particularly, to techniques for automatically establishing a long-lasting connection across computing devices configured for short-range wireless communication.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing devices may be configured for short-range wireless communication, such as near field communication (NFC). For example, mobile phones can be configured for NFC with other mobile phones and/or other computing devices. NFC involves radio frequency (RF) communication between two or more computing devices over a relatively short distance, e.g., a few centimeters. Outside of this relatively short distance, the two or more computing devices may communicate via other communication protocols.

SUMMARY

A computer-implemented technique is presented. The technique can include initiating, at a first computing device including one or more processors, communication with a second computing device via a short-range wireless communication protocol. The technique can include receiving, at the first computing device, a set of information from the second computing device via the short-range wireless communication protocol, the set of information indicating: (i) a first application currently executing in a foreground at the second computing device, (ii) a unique identifier for the second computing device, and (iii) a port address for communication with the first application executing at the second computing device via another wireless communication protocol. The technique can also include automatically configuring, at the first computing device and in response to receiving the set of information from the second computing device via the short-range wireless communication protocol, communication between a second application at the first computing device and the first application executing at the second computing device via the other wireless communication protocol using the set of information. The first application and the second application can be a same type of software application.

In some embodiments, the automatically configuring includes automatically configuring, at the first computing device, communication between the second application executing at the first computing device and the first application executing at the second computing device via the other wireless communication protocol using the port address.

In other embodiments, the short-range wireless communication protocol is near field communication (NFC), the other wireless communication protocol is Bluetooth, and the port address for communication with the second computing device is a listening Bluetooth socket for the first application executing at the second computing device.

In some embodiments, the automatically configuring further includes: generating, at the second application executing at the first computing device, a callback for the port address, and sending, to the second application executing at the first computing device, a reply to the callback including the port address specified by the set of information from the second computing device.

In other embodiments, the technique further includes: determining, at the first computing device, whether the second application is installed at the first computing device, and obtaining, at the first computing device, the second application when the second application is not installed at the first computing device.

In some embodiments, the technique further includes determining, at the first computing device, whether the second application is currently executing in a foreground at the first computing device.

In other embodiments, the technique further includes launching, at the first computing device and in response to receiving the set of information from the second computing device, the second application when the second application is not currently executing at the first computing device.

In some embodiments, the technique further includes transitioning, at the first computing device and in response to receiving the set of information from the second computing device, the second application to the foreground at the first computing device when the second application is currently executing in a background at the first computing device.

In other embodiments, the technique further includes communicating between the second application executing at the first computing device and the first application executing at the second computing device via the short-range wireless communication protocol when the first and second computing devices are within a predetermined distance from each other.

In some embodiments, the technique further includes communicating between the second application executing at the first computing device and the first application executing at the second computing device via the other wireless communication protocol when the first and second computing devices are outside of the predetermined distance from each other.

A first computing device is also presented. The first computing device can include a communication device and one or more processors. The communication device can be configured to: initiate communication with a second computing device via a short-range wireless communication protocol, and receive a set of information from the second computing device via the short-range wireless communication protocol, the set of information indicating: (i) a first application currently executing in a foreground at the second computing device, (ii) a unique identifier for the second computing device, and (iii) a port address for communication with the first application executing at the second computing device via another wireless communication protocol. The one or more processors can be configured to, in response to receiving the set of information from the second computing device via the short-range wireless communication protocol, automatically configure the communication device for communication between a second application at the first computing device and the first application executing at the second computing device via the other wireless communication protocol using the set of information. The first application and the second application can be a same type of software application.

In some embodiments, the one or more processors are configured to automatically configure the communication device for communication between the second application executing at the first computing device and the first application executing at the second computing device via the other wireless communication protocol using the port address.

In other embodiments, the short-range wireless communication protocol is near field communication (NFC), the other wireless communication protocol is Bluetooth, and the port address for communication by the communication device with the second computing device is a listening Bluetooth socket for the first application executing at the second computing device.

In some embodiments, the one or more processors are configured to automatically configure the communication device for communication between the second application executing at the first computing device and the first application executing at the second computing device via the other wireless communication protocol by: generating, at the second application executing at the first computing device, a callback for the port address, and sending, to the second application executing at the first computing device, a reply to the callback including the port address specified by the set of information from the second computing device.

In other embodiments, the one or more processors are further configured to determine whether the second application is installed at the first computing device, and wherein the communication device is further configured to obtain the second application when the second application is not installed at the first computing device.

In some embodiments, the one or more processors are further configured to determine whether the second application is currently executing in a foreground at the first computing device.

In other embodiments, the one or more processors are further configured to launch the second application in response to receiving the set of information from the second computing device and when the second application is not currently executing at the first computing device.

In some embodiments, the one or more processors are further configured to transition the second application to the foreground at the first computing device in response to receiving the set of information from the second computing device and when the second application is currently executing in a background at the first computing device.

In other embodiments, the communication device is further configured to communicate between the second application executing at the first computing device and the first application executing at the second computing device via the short-range wireless communication protocol when the first and second computing devices are within a predetermined distance from each other.

In some embodiments, the communication device is further configured to communicate between the second application executing at the first computing device and the first application executing at the second computing device via the other wireless communication protocol when the first and second computing devices are outside of the predetermined distance from each other.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
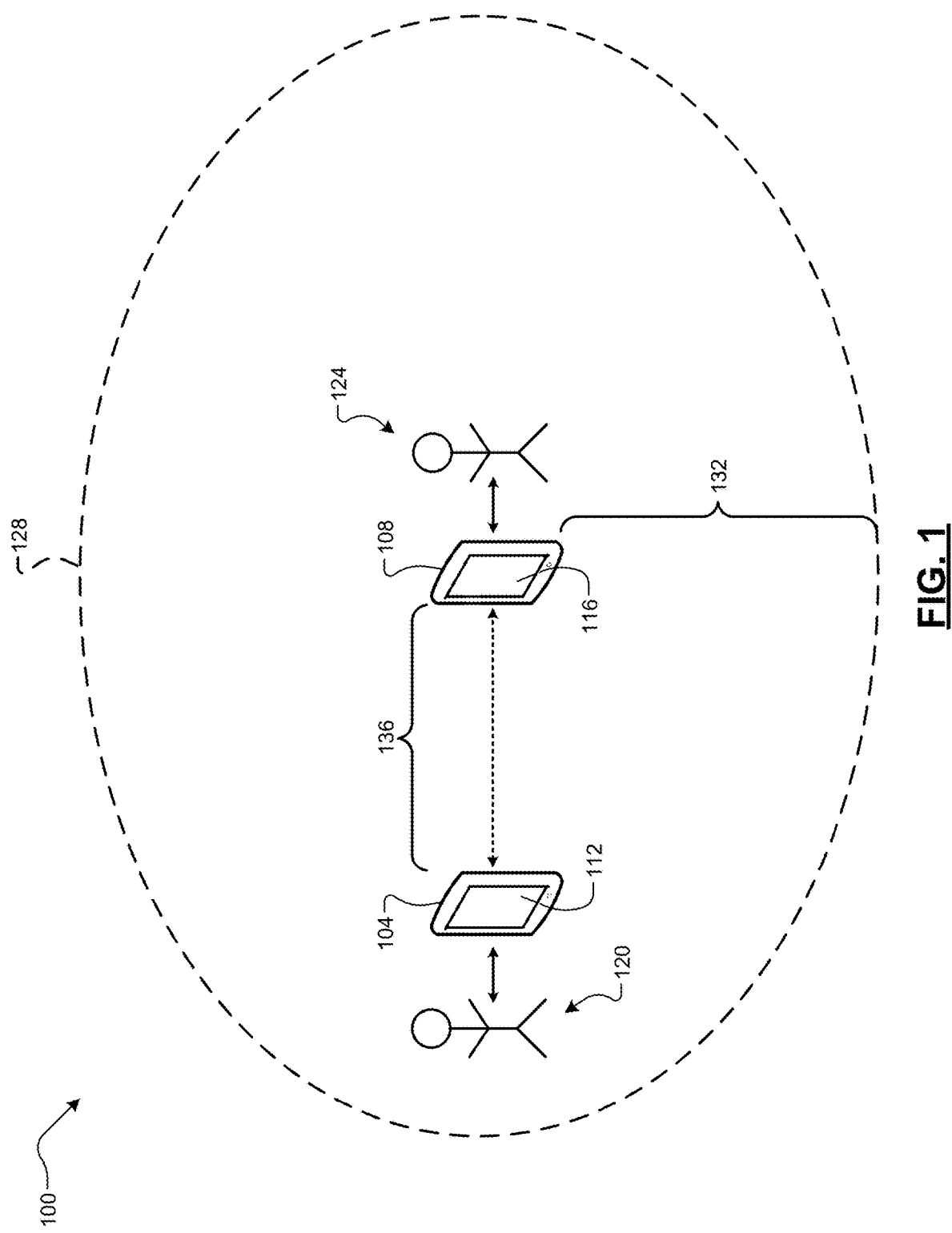
FIG. 1 is an illustration of short-range wireless communication between an example mobile computing device according to some implementations of the present disclosure and another mobile computing device.

As previously described, near field communication (NFC) involves radio frequency (RF) communication between two or more computing devices over a relatively short distance, e.g., a few centimeters. For example, a user may initiate NFC by positioning his/her mobile computing device within the required range for NFC with another computing device (a mobile computing device, a stationary computing device, etc.). As previously explained, however, NFC may be unavailable outside of the required range. In these situations, the computing devices may communicate via non-NFC protocols (Bluetooth, WiFi Direct, WiFi, etc.). These non-NFC protocols, however, typically require an exchange of information between the computing devices in order to configure and establish a connection. This exchange and configuration in order to establish the connection can be time consuming.

Accordingly, techniques are presented for automatically establishing a long-lasting connection across computing devices enabled for short-range wireless communication. While the techniques of the present disclosure are hereinafter described with specific reference to NFC and non-NFC mediums, it should be appreciated that the techniques of the present disclosure apply to other suitable short-range wireless communication mediums (Bluetooth, WiFi Direct, etc.) and other suitable non-short-range wireless communication mediums, e.g., WiFi. It should also be appreciated that the terms "long-lasting connection" as used herein can refer to any connection established via a non-NFC protocol. The techniques can include initiating, at a first computing device including one or more processors, communication with a second computing device via an NFC protocol. The techniques can include receiving, at the first computing device, a set of information from the second computing device via the NFC protocol, the set of information. The set of information can indicate: (i) a first application currently executing in a foreground at the second computing device, (ii) a unique identifier for the second computing device, and/or (iii) a port address for communication with the first application executing at the second computing device via a non-NFC protocol.

The techniques can also include automatically configuring, at the first computing device and in response to receiving the set of information from the second computing device via the NFC protocol, communication between a second application at the first computing device and the first application executing at the second computing device via the non-NFC protocol using the set of information. It should be appreciated that the terms "automatically configuring" as used herein can refer to automatically configuring communication via a non-NFC protocol between applications executing on different computing devices using an NFC protocol without having to exit the applications. For example only, Bluetooth pairing typically involves the user inputting a code in order to verify the identity of the device. The techniques of the present disclosure, however, provide for "automatically configuring" communication between applications executing on different computing devices via a non-NFC protocol, e.g., Bluetooth, without the user's intervention/interaction.

The first application and the second application can be a same type of software application, e.g., a video game application. In some cases, the first and second application can be the same software application. It should also be appreciated that the terms "same type of software application" as used herein can refer to applications being of a same type, e.g., a video game application in general, or in alternatively, the same application, e.g., a specific video game application. In other words, the same application, e.g., a specific video game application, can be executing on both the first and second computing devices. It is recognized, however, that the implementation and/or configuration of the application on the first and second computing devices may be different. The applications on the respective computing devices may wish to communicate directly in order to create a better multi-user environment, e.g., a better multiplayer gaming environment in video game applications.

Referring now to FIG. 1, a short-range wireless communication interaction 100, e.g., an NFC interaction, between an example mobile computing device 104 according to some implementations of the present disclosure and another mobile computing device 108 is illustrated. It should be appreciated that one or both of the mobile computing devices 104, 108 may be a stationary computing device (a desktop computer, a public computing terminal, etc.). For purposes of simplicity, the example mobile computing device 104 and the other mobile computing device 108 may be referred to herein as a first mobile computing device 104 and a second mobile computing device 108, respectively. The first mobile computing device 104 can receive input from and/or output information to a first user interface 112. Similarly, the second mobile computing device 108 can also receive input from and/or output information to a second user interface 116.

A first user 120 can interact with the first user interface 112 and a second user 124 can interact with the second user interface 116. In order to establish NFC between the first mobile computing device 104 and the second mobile computing device 108, the first mobile computing device 104 (the "initiator") initiates communication with the second mobile computing device 108 (the "target"). Specifically, the first mobile computing device 104 may generate an electromagnetic field 128 using radio frequency (RF) waves. For example, the RF waves may have a frequency of approximately 13.56 megahertz (MHz) within a bandwidth of approximately 14 kilohertz (kHz). Other frequency ranges, however, may also be used.

The electromagnetic field 128 extends outwardly from the first mobile computing device 104 for a first distance 132. The electromagnetic field 128, therefore, may cover an area based on the first distance 132. For example, the first distance 132 to achieve a successful NFC transmission may be approximately 20 centimeters (cm). NFC transmissions at the first distance 132, however, may be inconsistent and therefore may suffer from data loss. Therefore, a second distance 136 may be desired for more effective NFC transmission, the second distance 136 being shorter than the first distance 132. For example, the second distance 136 may be approximately 4 cm.

When the second mobile computing device 108 is brought within the electromagnetic field 128, e.g., by the second user 124, the second mobile computing device 108 may behave according to one of two operating modes. In a passive operating mode, the second mobile computing device 108 modulates a load to communicate back to the first mobile computing device 104. In an active mode, on the other hand, the second mobile computing device 108 alternates with the first mobile computing device 104 in generating the electromagnetic field 128. In other words, during the active mode only one of the first mobile computing device 104 and the second mobile computing device 108 is generating the electromagnetic field 128 at a given time while the other mobile computing device waits for data.

The first mobile computing device 104 can also execute the techniques according to some implementations of the present disclosure. The first mobile computing device 104 can initiate communication with the second mobile computing device 108 via an NFC protocol. The first mobile computing device 104 can receive a set of information from the second mobile computing device 108 via the NFC protocol. The set of information can include a port address for communication with a first application currently executing in a foreground at the second mobile computing device 108 via a non-NFC protocol, e.g., Bluetooth. The set of information can also include other information, such as a unique identifier for the second mobile computing device 108. The first mobile computing device 104 can also automatically configure communication between a second application at the first mobile computing device 104 and the first application executing at the second mobile computing device 108 via the non-NFC protocol using the set of information.

Figure 2:
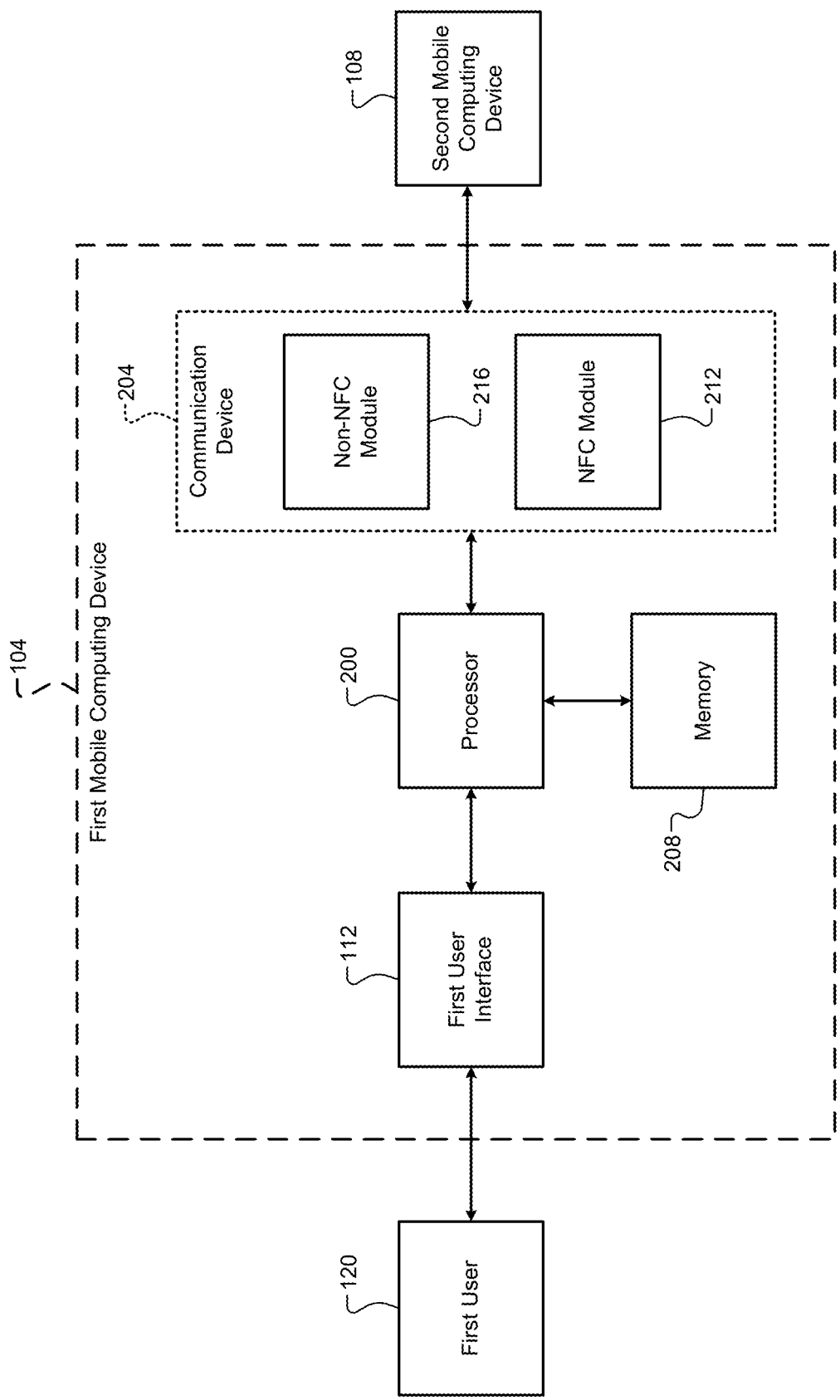
FIG. 2 is a functional block diagram of the example mobile computing device of FIG. 1.

Referring now to FIG. 2, a functional block diagram of the first mobile computing device 104 is illustrated. It should be appreciated that the second mobile computing device 108 can also have a same or similar functional block diagram. The first mobile computing device 104 can include the first user interface 112, a processor 200, a communication device 204, and a memory 208. As previously mentioned, the first user interface 112 can receive input and/or output information. For example, the first user interface 112 can receive input from the first user 120. The first user interface 112 can include any suitable components for receiving input and/or outputting information (a keyboard, a touch display, etc.).

The processor 200 can control operation of the first mobile computing device 104. It should be appreciated that the term "processor" as used herein can refer to either a single processor or two or more processors operating in a parallel or distributed architecture. The processor 200 can perform functions including, but not limited to, loading and executing an operating system of the first mobile computing device 104, controlling input/output at the first user interface 112, controlling communication between the first mobile computing device 104 and other computing devices, e.g., the second mobile computing device 108, via the communication device 204, and/or controlling read/write operations at the memory 208.

As mentioned above, the communication device 204 can control communication between the first mobile computing device 104 and other computing devices. The communication device 204 can further include an NFC module 212 and a non-NFC module 216. More specifically, the communication device 204 can use these modules to control NFC interaction and non-NFC interaction (Bluetooth, WiFi Direct, WiFi, etc.), respectively, between the first mobile computing device 104 and other computing devices, e.g., the second mobile computing device 108. The communication device 204 can include any suitable components for communicating via an NFC protocol and/or other non-NFC protocols (a transceiver, an NFC chip, etc.). For example only, the NFC protocol may be defined according to the ISO/IEC 18092 standards. The memory 208 can be any suitable storage medium (flash, hard disk, etc.) configured to store information at the first mobile computing device 104.

The processor 200 and the communication device 204 can also execute the techniques of the present disclosure, which are described in detail below. The communication device 204 can be configured to initiate communication with the second mobile computing device 108 via an NFC protocol. After initiating communication with the second mobile computing device 108 via the NFC protocol, an NFC communication link can be established between the first mobile computing device 104 and the second mobile computing device 108. The communication device 204 can then receive a set of information from the second mobile computing device 108 via the NFC communication link. The set of information may be received from the second mobile computing device 108 in response to a request generated at and transmitted by the first mobile computing device 104.

The set of information can include (i) a first application currently executing in a foreground at the second mobile computing device 108, (ii) a unique identifier for the second mobile computing device 108, and (iii) a port address for communication with the first application executing at the second mobile computing device 108 via a non-NFC protocol. It should be appreciated that the set of information can also include less than these three pieces of information, or even additional information. For example only, the set of information may only include the port address for communication with the first application currently executing in a foreground at the second mobile computing device 108.

In response to receiving the set of information from the second computing device via the NFC protocol, the processor 200 can be configured to automatically configure the communication device 204 for communication between a second application at the first mobile computing device 104 and the first application executing at the second mobile computing device 108 via the non-NFC protocol using the set of information. The first application and the second application may be the same type of software application, including but not limited to being the same application, e.g., a specific video game application.

More specifically, the processor 200 can be configured to automatically configure the communication device 204 for communication between the second application executing at the first mobile computing device 104 and the first application executing at the second mobile computing device 108 via the non-NFC protocol using the port address. For example only, the non-NFC protocol may be Bluetooth, and the port address for communication by the communication device 204 with the second mobile computing device 108 may be a listening Bluetooth socket for the first application executing at the second mobile computing device 108. The term "socket" as used herein can refer to one end-point of a two-way communication link between two programs running on a network. It should be appreciated that other suitable port addresses and other non-NFC protocols can be implemented.

As previously mentioned, the set of information can also include other information in addition to the port address to be used for communication with the first application executing at the second mobile computing device 108 via the non-NFC protocol. First, the set of information can also include an indication of whether the first application is executing in a foreground at the second mobile computing device 108. For example, the techniques of the present disclosure may be limited to situations where the first application is executing in the foreground at the second mobile computing device 108 (and thus not in the background) and therefore currently has the user's attention. Second, the set of information can also include a unique identifier for the second mobile computing device 108. For example, the unique identifier can be used to automatically associate the automatically configured communication settings with the unique identifier of second mobile computing device 108 for situations where the second mobile computing device 108 leaves the capable communication range of the non-NFC protocol.

After automatically configuring the communication device 204 for communication via the non-NFC protocol, a non-NFC communication link may be established. In some implementations, the automatic configuration of the non-NFC communication link between the between the first and second applications can include: generating, at the second application, a callback for the port address, and sending, to the second application, computing device, a reply to the callback including the port address specified by the set of information from the second computing device. For example only, the callback can be processed and the reply can be generated and sent by an operating system executing at the first mobile computing device 104 or another application executing at the first mobile computing device 104.

The processor 200 can also be configured to determine whether the second application is installed at the first mobile computing device 104. When the second application is not installed at the first mobile computing device 104, the communication device 204 can be configured to obtain the second application. For example, obtaining the second application can include downloading the second application via a network, receiving the second application from another computing device, or retrieving the second application from a memory. The processor 200 can also be configured to determine whether the second application is currently executing in a foreground at the first mobile computing device. For example, executing in the foreground can refer to the second application executing and being currently visible in a top layer at the first mobile computing device 104.

When the second application is not currently executing at the first mobile computing device 104, the processor 200 can be configured to launch the second application. For example, launching can refer to initializing and beginning execution of the second application at the first mobile computing device 104. The processor 200 can also be configured to transition the second application to the foreground at the first mobile computing device 104 when the second application is currently executing in a background at the first mobile computing device. For example, executing in the background can refer to the second application executing and not being currently visible (or being only partially visible) in a layer below the top layer at the first mobile computing device 104.

The communication device 204 can also be configured to communicate between the second application executing at the first mobile computing device 104 and the first application executing at the second mobile computing device 108 via the NFC protocol (via the NFC communication link) when the first and second mobile computing devices 104, 108 are within a predetermined distance (or predetermined range) from each other. As previously discussed, for example, the predetermined distance may be four centimeters. Similarly, the communication device 204 can also be configured to communicate between the second application executing at the first mobile computing device 104 and the first application executing at the second mobile computing device 108 via the non-NFC protocol (the non-NFC communication link) when the first and second mobile computing devices 104, 108 are outside of the predetermined distance from each other.

Figure 3:
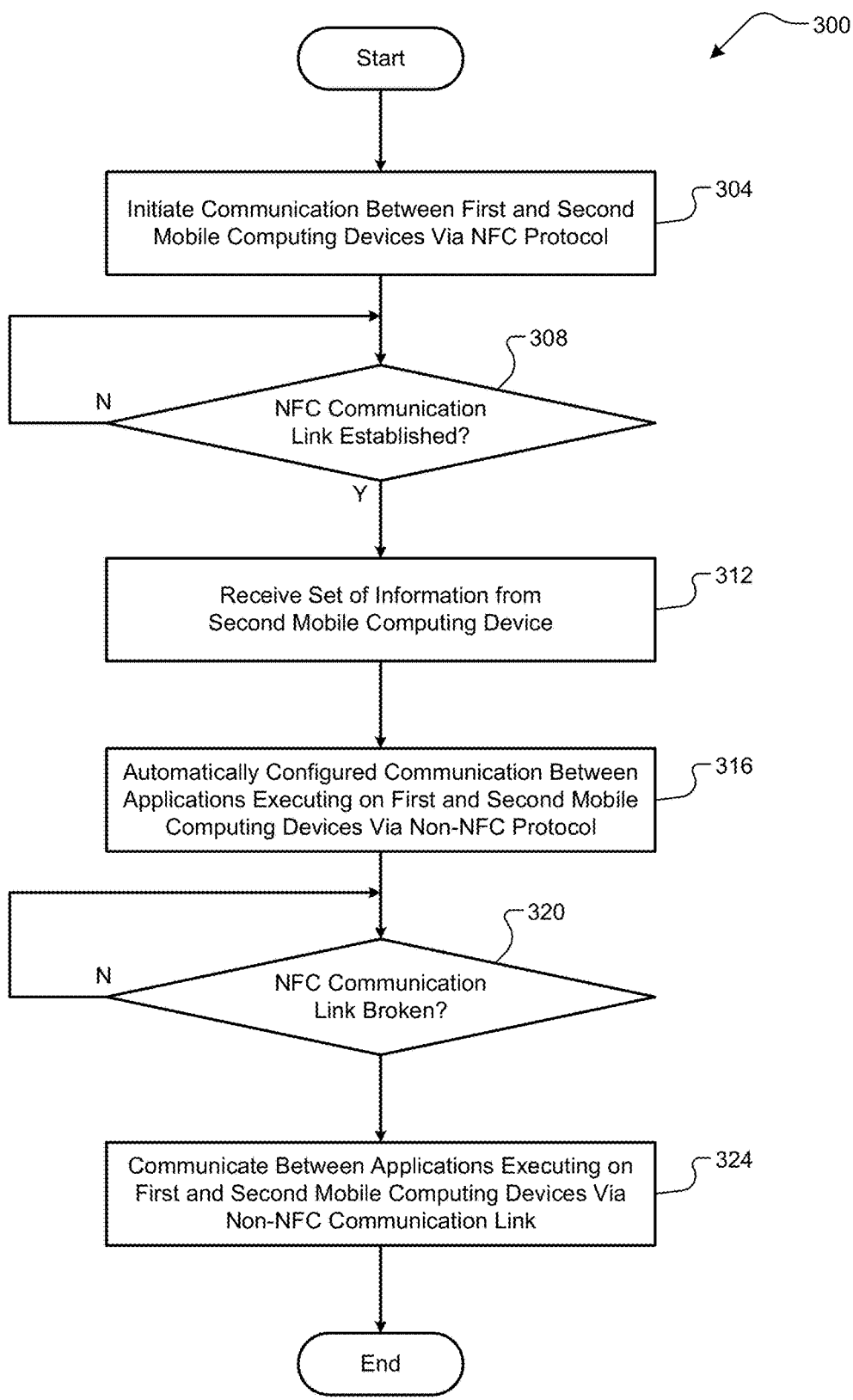
FIG. 3 is a flow diagram of an example technique for automatically establishing a long-lasting connection across devices configured for short-range wireless communication according to some implementations of the present disclosure.

Referring now to FIG. 3, a flow diagram of an example technique 300 for automatically establishing a long-lasting connection across NFC-enabled computing devices is illustrated.

At 304, the first mobile computing device 104 can initiate communication with the second mobile computing device 108 via an NFC protocol. For example, communication via the NFC protocol may be automatically initiated when the first mobile computing device 104 and the second mobile computing device 108 are brought within a predetermined range of each other.

At 308, the first mobile computing device 104 can determine whether an NFC communication link with the second mobile computing device 108 via the NFC protocol has been established. If the NFC communication link has been established, the technique 300 can proceed to 312. If the NFC communication link has not yet been established, the technique can return to 308.

At 312, the first mobile computing device 104 can receive a set of information from the second mobile computing device 108 via the NFC communication link. The set of information can indicate (i) a first application currently executing in a foreground at the second mobile computing device 108, (ii) a unique identifier for the second mobile computing device 108, and/or (iii) a port address for communication with the first application executing at the second mobile computing device 108 via a non-NFC protocol.

At 316, the first mobile computing device 104 can, in response to receiving the set of information from the second mobile computing device 108 via the NFC communication link, automatically configure communication between a second application at the first mobile computing device 104 and the first application executing at the second mobile computing device 108 via the non-NFC protocol using the set of information. The first application and the second application can be a same type of software application.

At 320, the first mobile computing device 104 can determine whether the NFC communication link has been terminated. For example, the NFC communication link may be terminated due to the first mobile computing device 104 and the second mobile computing device 108 being out of range for NFC. If the NFC communication link has been terminated, the technique 300 can proceed to 324. If the NFC communication link has not been terminated, the technique 300 can return to 320 and the second application executing at the first mobile computing device 104 can communicate with the first application executing at the second mobile computing device 108 via the NFC communication link.

At 324, the first mobile computing device 104 can begin communication between the second application executing at the first mobile computing device 104 and the first application executing at the second mobile computing device 108 via the non-NFC protocol. For example, this may include automatically establishing a non-NFC communication link via the non-NFC protocol.

The technique 300 can then end or return to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    initiating, between first and second computing devices each having one or more processors, communication via a first wireless communication protocol, the first wireless communication protocol being a short-range wireless communication protocol;
    receiving, at the first computing device from the second computing device via the first wireless communication protocol, a set of information for configuring communication via a different, second wireless communication protocol between same-type first and second applications executable by the first and second computing devices, respectively, the set of information indicating that the second application is currently executing in a foreground at the second computing device; and
    in response to receiving the set of information, configuring, by the first computing device, communication via the second wireless communication protocol between the first and second applications.

2. The computer-implemented method of claim 1, further comprising:
    requesting, by the first computing device from the second computing device, the set of information after the first and second computing devices initiate communication by the first wireless communication protocol.

3. The computer-implemented method of claim 1, wherein the configuring is performed without exiting the first and second applications.

4. The computer-implemented method of claim 1, wherein the set of information further indicating a port address for communication by the first application with the second application via the second wireless communication protocol.

5. The computer-implemented method of claim 4, wherein the configuring is performed by:
generating, at the first application, a callback for the port address; and
sending, to the first application, a reply to the callback including the port address specified by the set of information from the second computing device.

6. The computer-implemented method of claim 4, wherein the first wireless communication protocol is near field communication (NFC), wherein the second wireless communication protocol is Bluetooth, and wherein the port address for communication with the second computing device is a listening Bluetooth socket for the second application currently executing at the second computing device.

7. The computer-implemented method of claim 6, wherein the listening Bluetooth socket is one end-point of a two-way communication link between the first and second applications.

8. The computer-implemented method of claim 1, wherein the set of information indicates a unique identifier for the second application currently executing in the foreground at the second computing device.

9. The computer-implemented method of claim 1, further comprising:
determining, at the first computing device, whether the first application is installed at the first computing device; and
obtaining, at the first computing device, the first application when the first application is not installed at the first computing device.

10. The computer-implemented method of claim 1, further comprising:
in response to receiving the set of information from the second computing device, launching, at the first computing device, the first application when the first application is not currently executing at the first computing device.

11. The computer-implemented method of claim 1, further comprising:
determining, at the first computing device, whether the first application is currently executing in a background at the first computing device; and
in response to receiving the set of information from the second computing device, transitioning, at the first computing device, the first application to the foreground at the first computing device when the first application is currently executing in the background at the first computing device.

12. The computer-implemented method of claim 1, wherein the first application is currently executing at the first computing device, and further comprising:
communicating between the first application and the second application via the first wireless communication protocol when the first and second computing devices are within a predetermined distance from each other; and
communicating between the first application and the second application via the second wireless communication protocol when the first and second computing devices are outside of the predetermined distance from each other.

13. The computer-implemented method of claim 1, wherein the configuring of the communication via the second wireless communication protocol between the first and second applications is performed without exiting the first and second applications.

14. A computer-implemented method, comprising:
initiating, between first and second computing devices each having one or more processors, communication via a first wireless communication protocol, the first wireless communication protocol being a short-range wireless communication protocol;
requesting, by the first computing device from the second computing device, a set of information for configuring communication via a different, second wireless communication protocol between first and second applications executable by the first and second computing devices, respectively;
receiving, at the first computing device from the second computing device via the first wireless communication protocol, the set of information; and
in response to receiving the set of information, configuring, by the first computing device, communication via the second wireless communication protocol between the first and second applications.

15. The computer-implemented method of claim 14, wherein the set of information further indicating a port address for communication by the first application with the second application via the second wireless communication protocol.

16. The computer-implemented method of claim 15, wherein the configuring is performed by:
generating, at the first application, a callback for the port address; and
sending, to the first application, a reply to the callback including the port address specified by the set of information from the second computing device.

17. The computer-implemented method of claim 15, wherein the first wireless communication protocol is near field communication (NFC), wherein the second wireless communication protocol is Bluetooth, and wherein the port address for communication with the second computing device is a listening Bluetooth socket for the second application currently executing at the second computing device.

18. The computer-implemented method of claim 14, wherein the configuring is performed without exiting the first and second applications.

19. The computer-implemented method of claim 14, wherein the set of information indicates a unique identifier for the second application currently executing in a foreground of the second computing device.

20. A first computing device having one or more processors configured to perform operations comprising:
initiating communication with a second computing device via a first wireless communication protocol, the first wireless communication protocol being a short-range wireless communication protocol;
requesting a set of information for configuring communication via a different, second wireless communication protocol between first and second applications executable by the first and second computing devices, respectively, from the second computing device;

receiving the set of information from the second computing device via the first wireless communication protocol, the set of information indicating (i) that the second application is currently executing in a foreground at the second computing device and (ii) a port address for communication by the first application with the second application via the second wireless communication protocol; and in response to receiving the set of information, configuring communication via the second wireless communication protocol between the first and second applications.

* * * * *